(12) United States Patent
Kubo (10) Patent No.: US 7,158,817 B2
(45) Date of Patent: Jan. 2, 2007

(54) PORTABLE TERMINAL

(76) Inventor: Masaharu Kubo, 2-29-8 Akatuki-cho, Hachioji-shi, Tokyo 192-0043 (JP)

(*) Notice: Subject to any disclaimer, the term of this patent is extended or adjusted under 35 U.S.C. 154(b) by 0 days.

(21) Appl. No.: 11/296,316

(22) Filed: Dec. 8, 2005

(65) Prior Publication Data

US 2006/0211459 A1    Sep. 21, 2006

(30) Foreign Application Priority Data

Mar. 17, 2005   (JP) .............................. 2005-116232

(51) Int. Cl.
*H04M 1/00* (2006.01)
(52) U.S. Cl. .................. 455/575.3; 455/575.4; 379/433.12; 16/303; 439/10
(58) Field of Classification Search ............ 455/575.1, 455/575.3, 575.4, 90.3, 556.1, 556.2, 566; 379/433.12, 433.13; 16/303, 329, 330, 341, 16/342; 439/10, 31
See application file for complete search history.

(56) References Cited

U.S. PATENT DOCUMENTS 6,766,181 B1* 7/2004 Newman et al. ......... 455/575.3

| | | | |
|---|---|---|---|
| 2001/0004269 A1 | 6/2001 | Shibata et al. | |
| 2002/0077161 A1* | 6/2002 | Eromaki | 455/575 |
| 2003/0100338 A1* | 5/2003 | Lee | 455/556 |
| 2004/0051944 A1* | 3/2004 | Stark | 359/448 |
| 2005/0164752 A1* | 7/2005 | Lau et al. | 455/575.3 |
| 2005/0266897 A1* | 12/2005 | Ahn et al. | 455/575.1 |

* cited by examiner

*Primary Examiner*—Lee Nguyen
(74) *Attorney, Agent, or Firm*—Mattingly, Stanger, Malur & Brundidge, P.C.

(57) ABSTRACT

This portable terminal comprises, a first panel at least having a display, a second panel at least having a keyboard and a hinge unit attached on both the first panel and the second panel, wherein the hinge unit comprises both rotating mechanism around a center axis of said hinge unit and sliding mechanism in the longitudinal direction along the center axis of the hinge unit. The panels are electrically connected by interconnection scheme having both sliding contacts and rotating contacts. The scheme saving net numbers of keys is realized by the introduction of a convertible key concept corresponding to state of either that the portable terminal is used in a slid form as a wireless voice telephone or that it is used in a rotated form as a terminal making text data like a personal computer.

8 Claims, 7 Drawing Sheets

PORTABLE TERMINAL

BACKGROUND OF THE INVENTION

1. Field of the Invention

The present invention, hereof, relates to a portable terminal which is capable of a wireless voice telephone and an internet terminal for text data communication as well as a video camera (both for still picture and for moving picture).

2. Description of the Related Art

Key driving forces of information technology innovation in contemporary human life have been a personal computer (PC) for internet access and a wireless telephone (cellular phone), which are capable of wireless communication in any mobile circumstance.

The PC was used as an equipment for calculation, data processing and controlling at the early stage of its usage.

In addition to those applications, at present, the role of the PC as an internet terminal has significantly increased.

Portable terminals are categorized into wired type and wireless type in terms of with or without telecommunication lines. The types of signals that a user sends and receives by a terminal are, (1) audio or voice data used in a wireless telephone, (2) text data mainly used in emails of internet access and (3) video data used in a video camera.

Portable terminals, which are capable of wireless communication in mobile environment, are categorized into three forms in terms of man-machine-interface; handling and/or manipulating capability as follows.

(1) Voice communication by use of a portable terminal handled by one side hand of the user.
(2) Emailing for internet communication manipulated by fingers of both his hands pushing keyboards on the portable terminal.
(3) Taking pictures by holding the terminal as a video camera at both edge sides of the terminal with both his hands and by operating a button such as a shutter by use of one finger of his hand.

From man-machine-interface viewpoint, the PC is easy to use for the purpose as an internet terminal because it is capable of inputting text data of email since it has more than 50 keys (for alphabet characters, numerical characters, marks and functions) on the keyboard. One of the typical form in its usage is that a user opens the two panels facing their longer front sides toward him and that he manipulates its keys by fingers of his both hands.

However, the PC has been differently used for voice communication from the wireless telephone because of its larger size, heavier weight, and higher power consumption. In other words, a physical form for voice communication is significantly different from that of the wireless telephone because it is very difficult to hold the PC by his single hand. Hence, in using the PC as a voice communication terminal, he is optionally forced to use a microphone, a speaker, an earphone, or an overhead microphone/speaker on his head and face, which are optionally attached to the PC.

These kinds of usage are troublesome to him from man-machine-interface viewpoint.

On the contrary, voice communication is conventionally carried out by using the wireless telephone, which is composed of the two piece of panels with a hinge unit attached on their edge sides. One of a typical form in its usage is that a user opens the two panels facing the shorter front sides toward him and that he rotates the two panels around the center axis of the hinge unit by which the length of the telephone is extended almost as long as the length between his mouth and his ear. He can hold the telephone by his single hand because its width (length of the shorter front side) and its thickness are small enough to fit the size of his hand and fingers. Another typical form of a-wireless telephone in use of voice communication is that a user slides two panels so as to extend its length sufficient enough to the length mentioned above.

However, the telephone is too small to accommodate the sufficient numbers (over 50) of keys (covering full English alphabet characters; 26, for example) on its panels for the purpose of inputting text data in emailing communication which is essential as an internet terminal.

Known is a wireless telephone having some unique mechanism by which the telephone is used as a camera as well as a telephone [reference 1] considering man-machine-interface.

[reference 1]: United States Patent Application, Shibata et al, PORTABLE TERMINAL, Pub. No, US 2001/0004269 A1, Pub, Date: Jun. 21, 2001

In this disclosed art, the mechanism has a linked mechanisms having two freedom of rotation; X and Y direction. That is, in use of a camera, a user rotates two panels of the telephone in Y direction after he opens them by rotating it in the X direction.

Also known is a terminal which accommodates about 60 keys (alphabetical characters, numerical characters, marks and functions) with rotating mechanism and facilitates inputting text data for internet access such as emailing in addition to wireless vice telephone function. However, the terminal accommodates additional keys (10 numerical keys and some function keys for wireless voice telephone to the about 60 keys above mentioned, resulting in that the terminal becomes thicker and heavier.

To summarize all of those previous arts, portable terminals so far only have either slide mechanism or rotate mechanism in its hinge unit, resulting in some deficit from man machine interface standpoint.

SUMMARY OF THE INVENTION

The purpose of this invention is to provide a means solving the issues mentioned above.

The inventor pursues solution such that the following three functions for a portable terminal in mobile circumstance which suffices man-machine-interface;

(1) in handling it in use of a wireless voice telephone.
(2) in manipulating keys in its keyboard in use of a terminal making text data for email.
(3) in both handling and manipulating it in use of a video camera.

At first, the inventor provides a means realizing (1) and (2) mentioned above, simultaneously.

That is, provided is the means realizing a portable terminal featuring as follows;

(a) In case of unused condition, its size is as small as possible.
(b) In case of using it as a wireless voice telephone, its length is close to the distance between the mouth and the ear of its user while its thickness is thin enough to fold his fingers around where he handles it with his fingers of his single hand
(c) In case of using it as a terminal for making text data for email, both area of its keyboard portion on one of the panel and area of its display portion on the another panel are large enough to manipulate keys in its keyboard by fingers of his both hands.

It is invented that a means realizing a portable terminal featuring the requirement mentioned above.

In another word, provided is the means that the portable terminal is composed of the two panels is connected at a novel hinge unit attached on the panels, which is capable of both sliding and rotating mechanism, simultaneously.

Also provided is an interconnection scheme between the panels under condition of the hinge unit mechanism mentioned above.

Also provided is a scheme saving net numbers of keys is realized by the introduction of the invented convertible key concept.

Furthermore, in order to have function (3) in addition to (1) and (2) above mentioned, provided is a means realizing a terminal featuring that a part of the camera unit, at least, comprising a lens unit is accommodated on an opposite surface of one of the panel where the keyboard is arranged on its surface place facing to the another panel having the display device.

Furthermore, in order to secure a larger size of the display device, provided is a means realizing a terminal featuring that the panel having display itself is composed of two panels connected by an additional hinge unit attached on while it has the same mechanism of the sliding and rotating mechanism as its hinge unit connecting the panel having keyboards.

BRIEF DESCRIPTION OF THE DRAWINGS

The present invention will be understood more fully from the detailed description given here below and from the accompanying drawings of the preferred embodiment of the invention, which, however, should not be taken to be limitative to the invention, but are for explanation and understanding only.

In the drawings.

DETAILED DESCRIPTION OF THE PREFERRED EMBODIMENTS

The first preferred embodiment of the present invention will be discussed hereinafter in detail with reference to the accompanying drawings from FIGS. 1 to 7B.

In the following description, numerous specific details are set forth in order to provide a thorough understanding of the present invention.

It will be obvious, however, to those skilled in the art that the present invention may be practiced without these specific details. In other instance, well-known structures are not shown in detail in order to unnecessary obscure the present invention.

Figure 1:
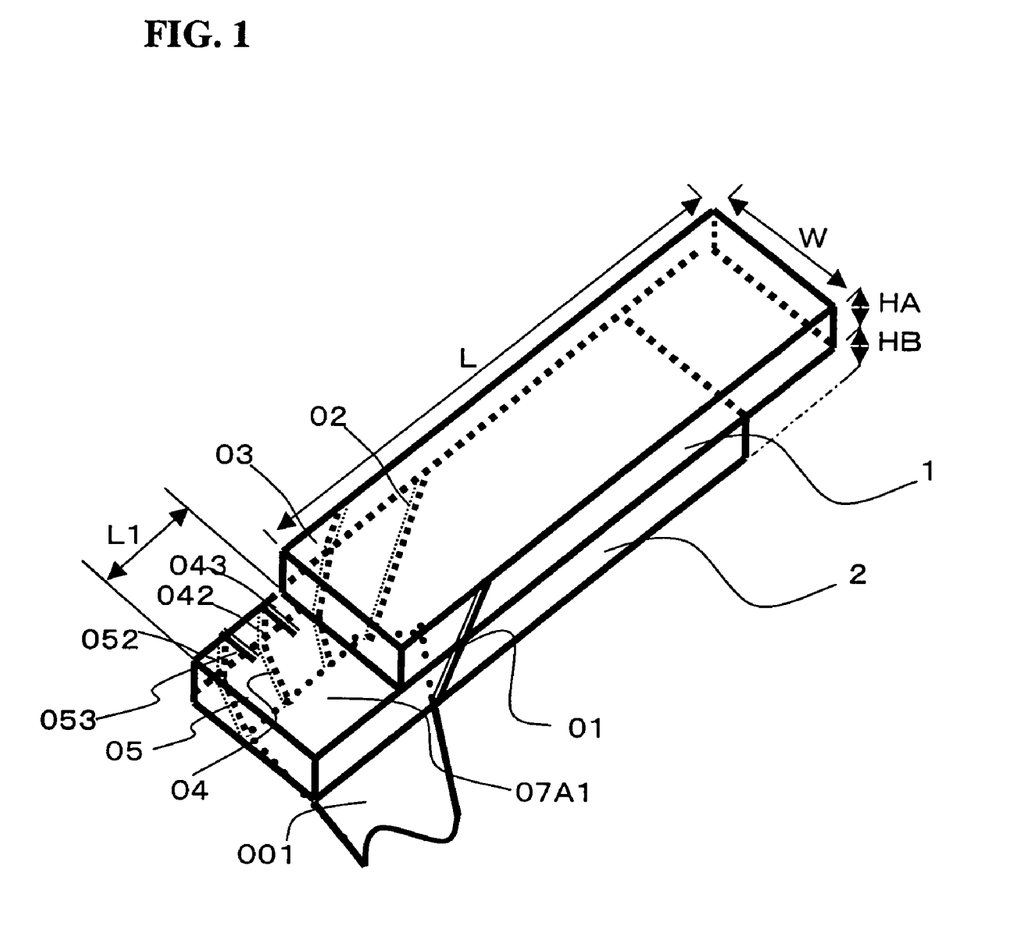
FIG. 1 is a conceptual perspective view in handling with a single hand a portable terminal with a sliding mechanism as a wireless voice telephone according to both prior arts and a first embodiment of the present invention.

FIG. 1 is a drawing explaining man-machine-interface in case of handling with a single hand a portable terminal as a wireless voice telephone composed of two panels sliding each other.

Figure 2:
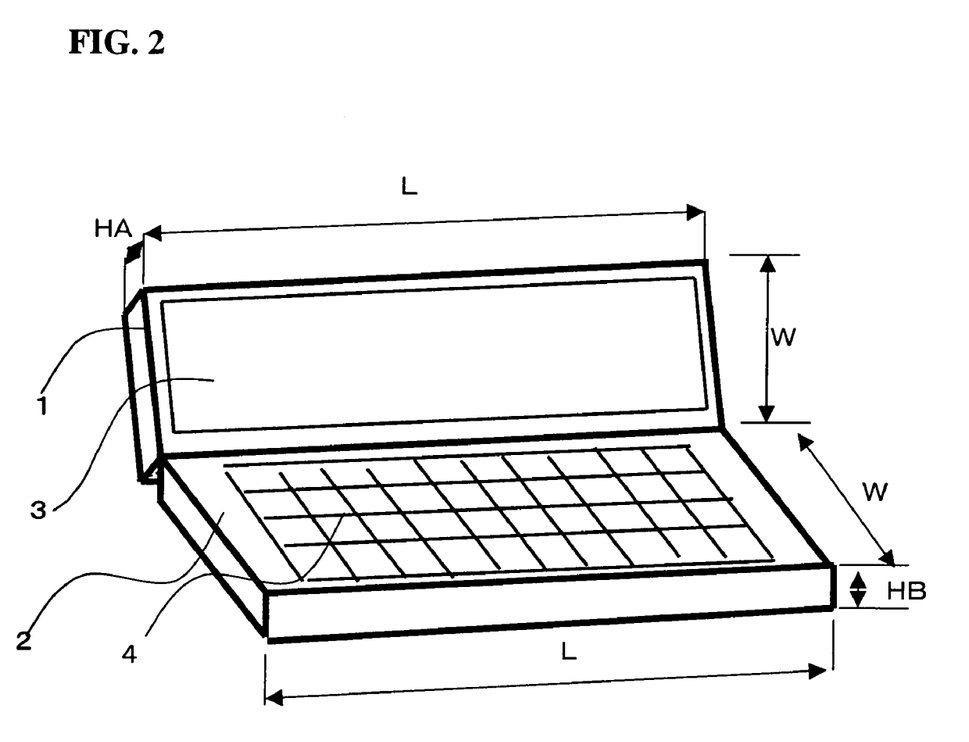
FIG. 2 is a conceptual perspective view in manipulating with fingers of both hands (not shown) keys in a keyboard on a portable terminal with a hinge unit of rotating mechanism, inputting text data according to both prior arts and the first embodiment of the present invention

FIG. 2 is a drawing explaining man-machine-interface in case of manipulating with fingers of both hands (not shown) keys in a keyboard on one of the panels of the terminal making text data after opening the panels facing to its user by rotating a hinge unit attached on the panels.

In FIG. 1, the terminal is composed of the first panel 1 (length L, width W and thickness HA) and of the second panel 2 (length L, width W and thickness HB).

In FIG. 1, 1 and 2 represent the first panel and the second panel of the terminal above mentioned by sliding each other from their fully overlapped state (unused condition) until sliding length becomes L1 so as for its user easily to hold only the panel 2, with his single hand, specifically with his third and little fingers.

At first, ease of handling with a single hand will be explained by using FIG. 1 as follows.

It is found to be the best way to handle the terminal by placing a thumb 01 to one side of 1 and 2, and winding both a third finger 04 and a little finger 05 till a surface portion 07A1 around the second panel 2.

To rephrase, the best way is described as placing a portion 043 between a third joint and a tip of the third finger 04 and the same portion 053 of the little finger 05 at the surface position 07A1 of the second panel 2 while winding around the second panel 2 with the other positions of the third and little fingers 04, 05.

Thereby, some guiding principles are as follows in case of handling with a single hand the portable terminal as a wireless voice telephone composed of the two panels 1 and 2.

(1) Volume of the terminal (L×W×(HA+HB)) should be as small as possible in case of the terminal in unused state.

(2) Width 071 of the terminal should be a little bit shorter than length between a root of the thumb 01 and the middle finger 03 or the third finger 04.

(3) The two panels 1 and 2 should be extended up to L+L1 closing to distance between a mouth and an ear of its user by sliding the panels each other.

(4) Length L should be longer than width W.

(5) Thickness HB of the second panel 2 should be a little bit thinner than lengths 042, 052 between the first and the second joint of the third finger 04 and the little finger 05, respectively.

In the next, some guiding principles will be explained by using FIG. 2 as follows in case of manipulating keys in a keyboard 4 on the panel 2 composing a portable terminal like a PC with its user's fingers of both hands(not shown).

(6) As shown in FIG. 2, the panels 1,2 are opened by rotating a hinge (not shown) of the terminal connecting the panels 1, 2, which is located on a desk or user's laptop so as to be its longer side (length L 070) facing to its user who manipulates keys in the keyboard 4 to make text data while looking a display device 3.

(7) The size of its keyboard 4 and its display device 3 (proportioning to the area L×W) should be large enough to be manipulated by its user.

In addition to the above, when using the terminal in FIG. 2 as a video camera (for still and motion picture), additional guiding principle will be as follows.

(8) It is the best way to hold the portable terminal, which is formed in fully overlapped state of the panels 1, 2, by both hands and to press a shutter button (for still camera) and/or a video button (for movie camera) by use of a finger (pointing finger) of either hand.

Practical forms of the terminal for this purpose will be shown later in FIG. 4 and FIG. 5A.

By holding the terminal with both hands, camera shake is able to be avoided.

It is concluded that in order to resolve man-machine-interface issues mentioned in the prior art, the requirement for a portable terminal capable of either a wireless voice telephone, a terminal for making text data such as email, or a terminal as a video camera, simultaneously, must have a mechanism comprising both sliding and rotating functions for its hinge unit.

Another requirement for this purpose is to realize interconnection scheme between the panels of the terminal with the mechanism mentioned above. This scheme is realized by interconnection contact in the hinge unit, comprising both a part of which is made of sliding contacts, and another part of which is made of rotating contact by use of flexible printed sheet.

Practical embodiments of the present invention was carried out on the basis of the guiding principle mentioned above.

Hereafter, a first embodiment of the present invention will be explained in detail using FIG. 3 to FIG. 7B.

FIGS. 3 to 7B describe a portable terminal which has a form factor that meets the ease of use principle stated above.

Figure 3:
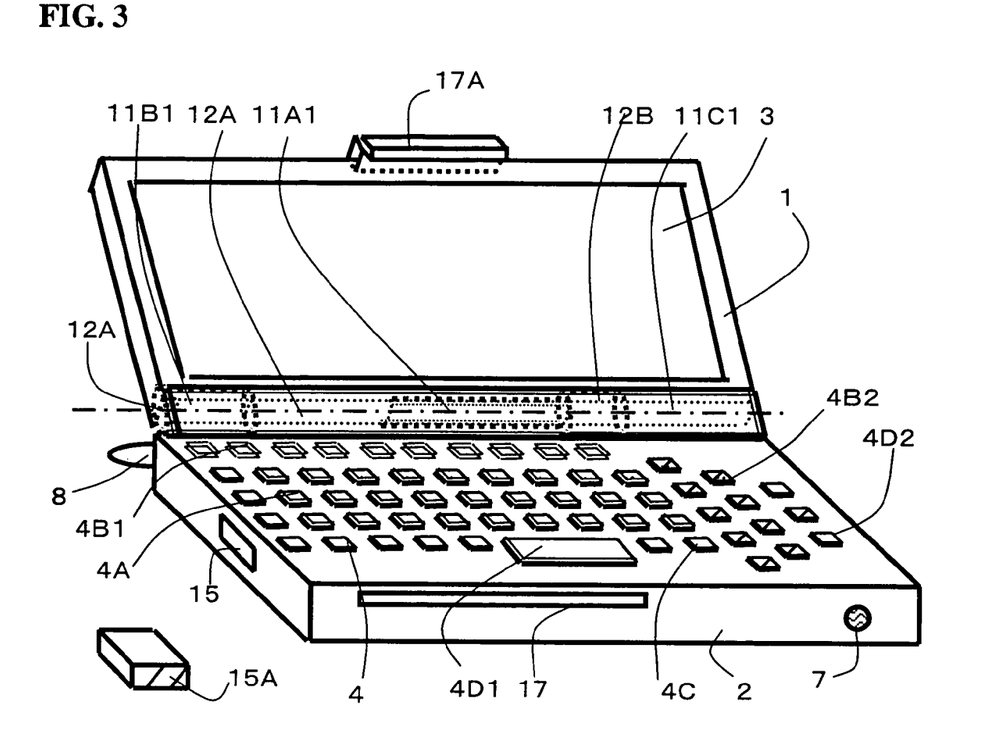
FIG. 3 is a detail perspective view of a portable terminal with a hinge unit capable of both sliding and rotating mechanisms according to the first embodiment of the present invention in case of the portable terminal as a PC inputting text data.

FIG. 3 is a drawing that shows a status of the terminal making text data like a PC when used for internet access such as for sending emails. FIG. 4 describes a status of the terminal when not in use or used as a video camera. FIG. 4 is a drawing when FIG. 3 is turned upside down.

Figure 4:
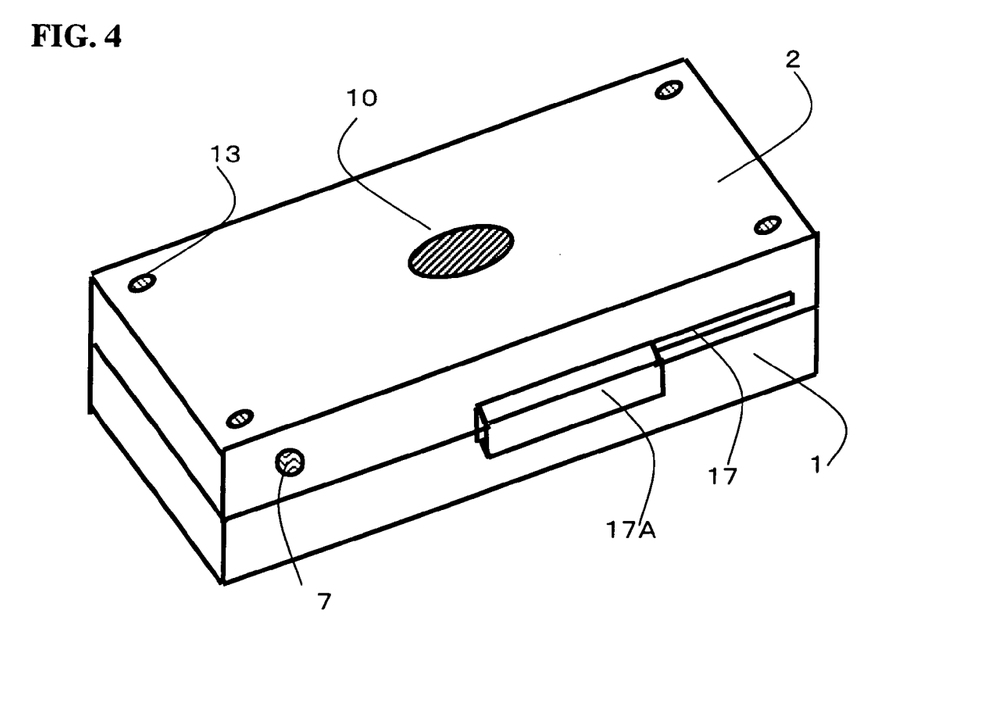
FIG. 4 is a detail perspective view of the portable terminal according to the first embodiment of the present invention flipped over upside down from its left side toward its right side after closing the panels from FIG. 3 in case of the portable terminal in unused condition and/or as a video camera.
Figure 5A:
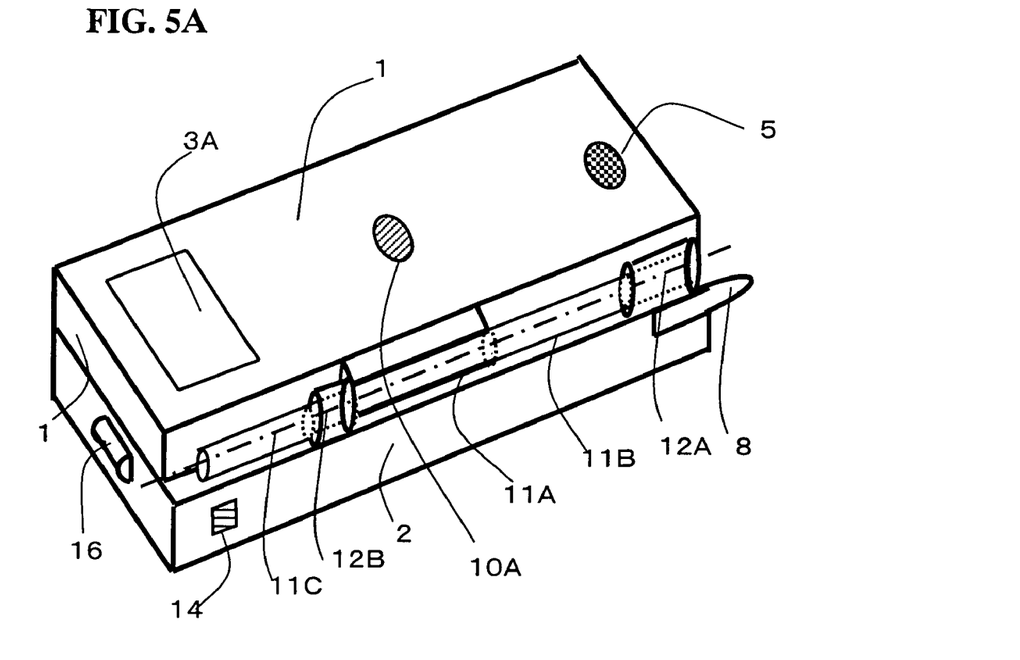
FIG. 5A is a detail perspective view of the portable terminal according to the first embodiment of the present invention rotated by 180 degree after closing the panels from FIG. 3.

FIG. 5A shows a status of the terminal when FIG. 4 is turned by 180 degree.

Figure 5B:
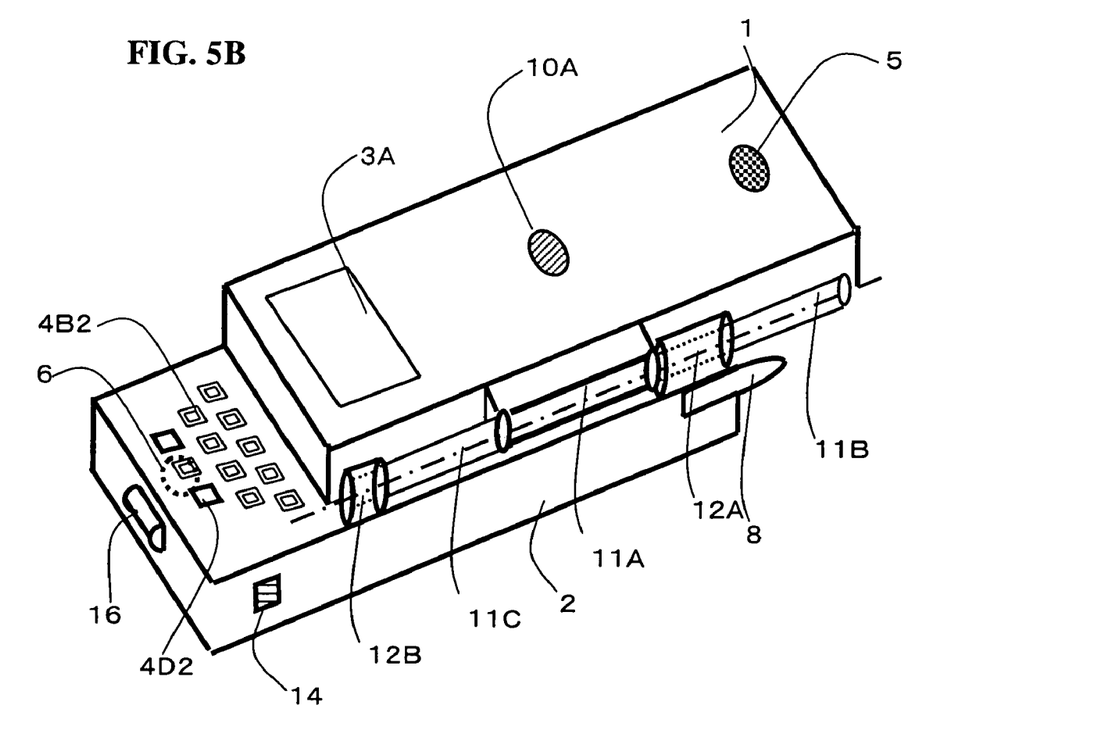
FIG. 5B is a detail perspective view of the portable terminal according to the first embodiment of the present invention sliding from FIG. 5A in case of the portable terminal as a wireless voice telephone.

FIG. 5B describes a status of the terminal when the first and the second panel in FIG. 5A are slid each other and the terminal is used as a wireless voice telephone.

In FIG. 3 to 7, 1 represents the first panel. On the panel 1, there are a display device 3 and a speaker 5, which outputs audio signal, acting as a component of a wireless voice telephone function.

In FIG. 3, 2 represents the second panel. On the panel 2, there are character keys 4A comprising 26 alphabet character for English, 10 numerical keys (0–9) 4B1, 10 numerical convertible keys 4B2, mark keys 4C such as period mark, function keys 4D, totaling 60 keys that consist the keyboard 4.

Figure 6:
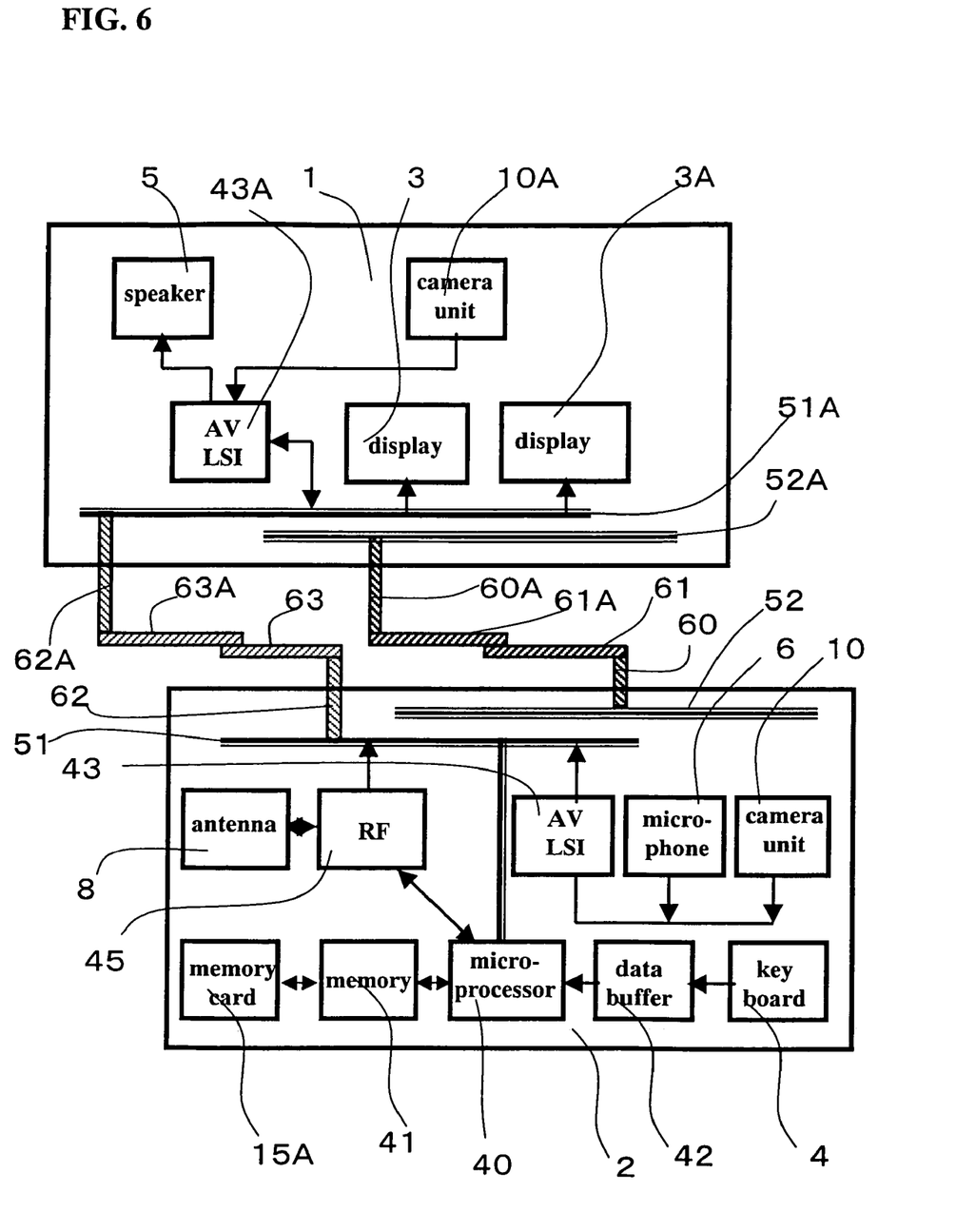
FIG. 6 is a block diagram comprising a conceptual scheme of interconnection around the sliding and rotating mechanisms at its hinge unit of the portable terminal according to the first embodiment of the present invention.

In FIG. 3, under the keyboard 4 in the panel 2, there are main electronic components of the portable terminal, e.g., microprocessor (MPU) 40, memory 41, audio/video signal processing LSI 43 mounted on a printed board as shown in FIG. 6. Also on the panel 2 are a microphone 6, which is a component of a wireless voice telephone and a power switch 7, an antenna 8, and a slot 15 to comply with a semiconductor storage card 15A, as shown in a block diagram of the panel 2 in FIG. 6. Also as shown in FIG. 4, on the panel 2, there are a camera unit 10 and cushions 13 on the surface opposite to the surface where the keyboard 4 is arranged.

In FIG. 5A and FIG. 5B, on the panel 1, at the surface on an opposite side of the display device 3, is a camera unit 10A, which is used as a video camera for inner scenery, and also a display device 3A and the speaker 5. The display 3A is smaller in size than the display device 3 and is used to display dialed phone numbers with simple messages when the terminal is used as a wireless voice telephone. Simple messages are displayed just when a power of the portable terminal turns on.

The display 3A is used as well to display a picture of a target as a finder when the portable terminal is used as a video camera.

In FIG. 5A and FIG. 5B, a scroll dial 16 is placed at the side edge of the panel 2. The scroll dial 16 is used at least for a selection of simple messages displayed on the display 3A in case of the terminal used as a wireless voice telephone.

In FIGS. 3 to 5B, a hinge unit 11 is composed of 11A, 11B, 11C, 12A and 12B. 11A is a part of the hinge unit fixed to the panel 1; 11B, 11C are also parts of the hinge unit, which axises are the same as 11A. Diameters of 11B, 11C are a little bit smaller than 11A. 11B and 11C rotate with 11A.

The parts 11A, 11B and 11C of the hinge unit 11 are covered with covers 11A1, 11B1 and 11C1 as shown in FIG. 3., but for simplicity, those covers are omitted in other figures.

The parts 11A, 11B and 11C of the hinge unit can slide from FIG. 5(*a*) position to FIG. 5B position along a center line of the common axis. 11B and 11C are slid through inside (cavity) of the other parts 12A and 12B of the hinge unit attached on the pane 2 and can slide along the axis. The part of the hinge unit 11A has a cylindrical form with larger diameter than the inside diameter of 12A and 12B having cylindrical forms with cavity and so, both ends of the part 11A of the hinge unit work as stoppers which determine the maximum length that panels 1 and 2 can slide.

In FIG. 3 and FIG. 4, a hook 17A attached at the panel 1 can slide through a sliding hook slot 17 engraved at the panel 2. They are placed at the counter side of the hinge unit 11 composed of 11A, 11B, 11C, 12A and 12B.

Mechanism composed of the hook 17A and the sliding hook slot 17 helps stable sliding of the panels 1, 2, which are prevented from unneeded open of the counter side of the panels where the hinge unit 11 is placed in using the terminal as a wireless voice telephone.

It will be explained by using FIG. 5A and FIG. 5B as follows. In FIG. 5A and FIG. 5B, when the terminal is used as a wireless voice telephone, the panels 1, 2 are slid from FIG. 5A position to FIG. 5B position and then used by the user's holding the panel 2 by his single hand.

As shown in FIG. 5B, on the surface of the panel 2, which appears when the panels 1, 2 are slid, there are at least 10 numerical convertible keys 4B2 and a few function convertible keys 4D2, which he uses when dialing numbers. He recognizes the numbers he dialed by seeing display 3A on the panel 1.

In FIG. 5A and FIG. 5B, 11A, 11B and 11C can be slid within covers made of an elastic material 11A1, 11B1, 11C1 (shown in FIG. 3 but not shown in FIG. 5A and FIG. 5B to clarify the portion of the hinge unit) that can stretch and shrink as an accordion.

FIG. 6 is a drawing explaining block diagram of the terminal as well as conceptual physical interconnection scheme only at the portion between the panels 1 and 2 when the panels 1, 2 are slid each other as shown in FIG. 5B.

In the next, using FIG. 6, are explained signal transmissions, power, clock and ground connections between the panels 1, 2.

In FIG. 6, 60, 61 and 62, 63 represent power, clock, ground connections and signal bus lines at the parts 12A and 12B of the hinge unit 11, respectively.

In FIG. 6, 60A, 61A and 62A, 63A represent power, clock, ground connections and signal bus lines at the parts 11A of the hinge unit 11, respectively.

In FIG. 6, 51 and 52 represent power, clock, ground connections and signal bus lines within the panel 2, respectively.

In FIG. 6, 51A and 52A represent power, clock, ground connections and signal bus lines within the panel 1, respectively.

For interconnection, at the parts 61, 61A, 63 and 63A of the sliding portions 11A and 12A, 12B of the hinge unit, are applied sliding contacts whereas at the parts 60, 60A, 62 and 62A of the rotating portions 11A and 12A, 12B of the hinge unit 11, are applied special (bend-free) circuit sheets attached on the hinge parts mentioned above.

The special circuit sheets are embedded around both internal surface (cavity surface) of the parts 12A, 12B of the hinge unit and outside surface of the other parts 11A of the hinge unit.

The sheets are made of materials and are structured to comply to such movements (sliding and rotating).

Figure 7A:
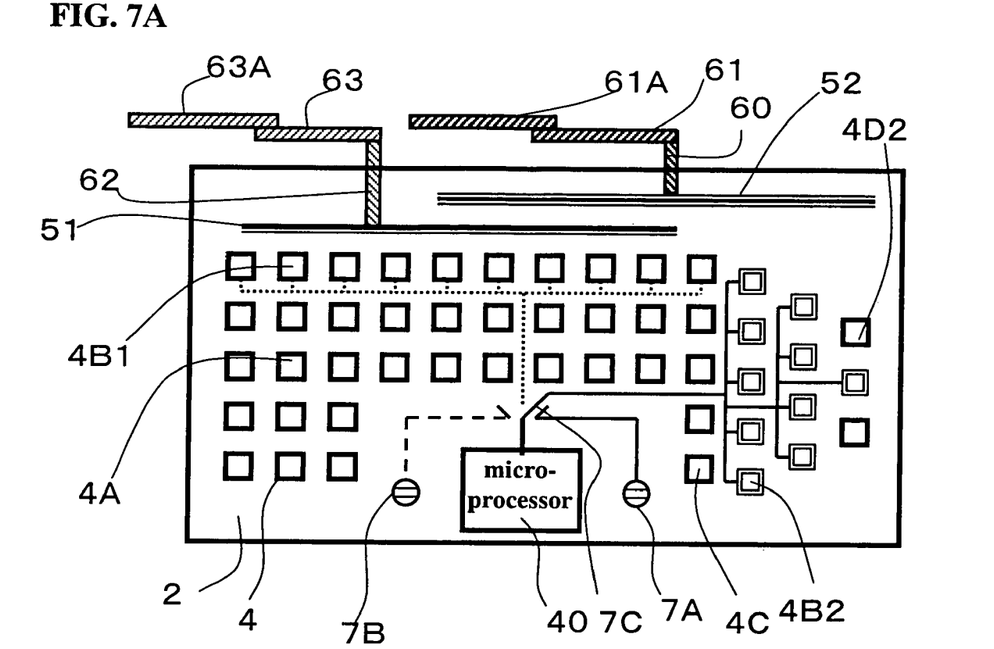
FIG. 7A is a block diagram comprising a conceptual scheme of numerical key assignment in case of sliding state for wireless voice telephone function.
Figure 7B:
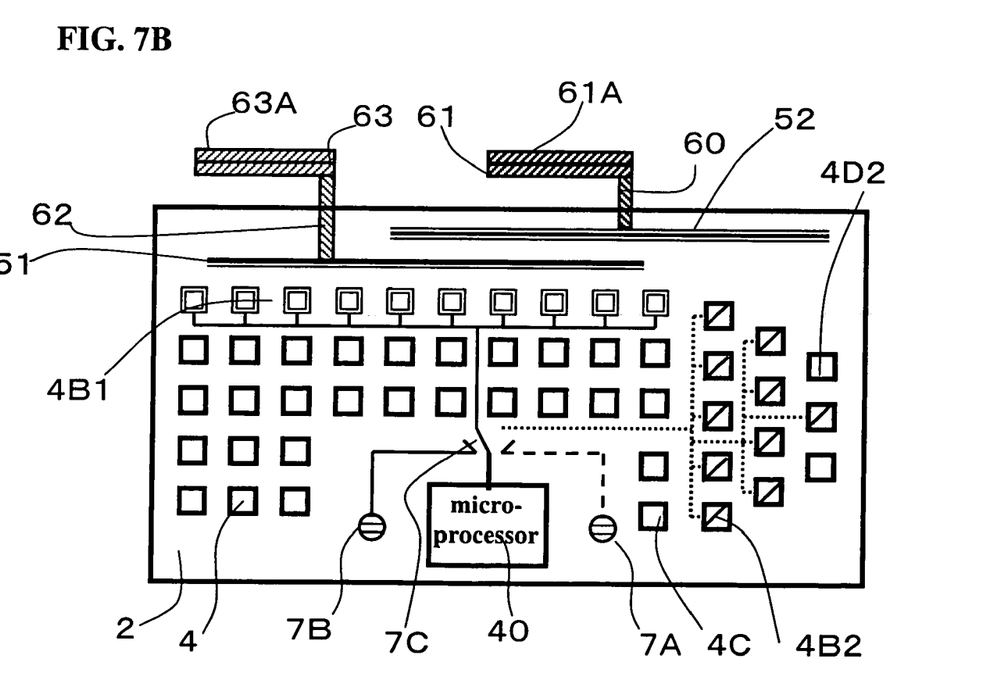
FIG. 7B is a block diagram comprising a conceptual scheme of numerical key assignment in case of inputting text data in opening state of the panels by rotating the hinge unit.

In the next, using FIG. 7A and FIG. 7B, is explained an assignment scheme of keys, at least, comprising 10 numerical convertible keys 4B2 in the keyboard 4, for example. Function convertible keys 4D2 will not be explained, but the same procedure for numerical convertible keys 4B2 will be also applied.

FIG. 7A is a conceptual diagram of key assignment comprising 10 numerical convertible keys 4B2, function convertible keys 4D2 representing their physical position in the panel 2 as well as control command sources 7A, 7B, and the microprocessor 40 in case of the panels 1, 2 slid each other for the use of the portable terminal as a wireless voice telephone as shown in FIG. 5B.

FIG. 7B is a conceptual diagram of that mentioned above in case of that the panels 1, 2 are opened each other for the use of the portable terminal as a terminal making text data like a PC as shown in FIG. 3.

In FIG. 7A, a command source 7A is actuated by sensing a signal in accordance with a slide motion of the panel 1, 2, each other.

In FIG. 7B, a command source 7B is actuated by sensing a signal in accordance with open of the panels 1, 2, each other.

In FIGS. 7A and 7B, a switch 7C determines whether the numerical keys 4B1 or the numerical convertible keys 4B2 should be selected by depending on use mode of the terminal. It transfers key assignment signal generated from the microprocessor 40 controlled with signals of command sources 7A, 7B. It should be noted that the connection lines drawn in FIG. 7A, 7B do not mean actual physical connection lines, but merely represent either solid line as selected 10 numerical keys or dashed lines as unselected 10 numerical keys.

In FIG. 7B, that is, the numerical convertible keys 4B2 are able to be assigned as function, mark or alphabetical character keys in stead of numerical keys which are the keys 4B1 assigned by the microprocessor 40.

As shown in FIG. 7A, 7B, the numerical keys are able to be assigned at the best position corresponding to the use form of the terminal from man-machine-interface standpoints. Same convertible function are given to the function keys 4D2, which can change their role depending on use mode of the terminal. It should be noted that over all numbers of keys can substantially be saved when the key numbers are summed up considering full usage of the terminal as both a wireless voice telephone and a terminal making text data.

In the next, using FIG. 4 and FIG. 5A, are explained the portable terminal as a video camera.

In FIG. 4 and FIG. 5A, a shutter button 14 is located in a position where 90 degrees from the light axis of lens of the camera unit 10 and 10A, where it is easy to operate by one of the fingers of hands (especially pointing finger) holding the portable terminal as a video camera, for example, at the edge sides of the portable terminal as shown in FIG. 4 and FIG. 5A.

The location for the shutter button 14 that enables easy usage stated here is a position within the area where one of the fingers (especially the pointing finger) of either of the hands can reach when the terminal is used as a video camera to press the shutter button 14 when both hands are holding both edge of the terminal width.

Therefore, the location of the shutter button 14 can be at the thickness side of the terminal or at the same side where the camera unit 10A is located instead of at the back side of the panel 2 at the width side as shown in FIG. 4 and FIG. 5A. This form of usage is very similar to that a traditional camera (optical and digital) and has the characteristic of having increased operability (such as avoiding vibration when pressing the shutter button 14).

In FIG. 4, the camera unit 10 has a lens tube (not shown) that extends from the opposite side of the panel 2 driven by a motor when the user takes pictures of exterior scenery. When the terminal is used as internet access device, the camera unit 10 is shrunk down to dent into the panel 2.

On the surface of the panel 2 at the opposite side of the keyboard 4, there are short cushions 13 at the four corners of the panel surface.

In case of that the terminal is used for making text data of email like a PC and is placed on a desk, these cushions work as buffers between the desk and the terminal. Hence, when the camera unit 10 is stored in the panel 2, camera unit 10 does not touch the desk where the terminal is placed on.

The size of the terminal is; for the panel 2, length 14 centimeters, width 5.6 centimeters, thickness 1.2 centimeters; for the panel 1, length 14 centimeters, width 5.6 centimeters, thickness 0.8 centimeters. When the terminal panels are slid, the thickness of the part of the terminal which the user holds is thinner than the length between the second and third joint of his third and little finger (which is about 1.5 centimeters) and so it is easy for him to handle when the terminal is used as a wireless voice telephone.

It will be described how to operate the terminal in the following order;

(1) when the terminal is not in use, when it is used (2) as a wireless voice telephone, (3) as a video camera, (4) as a terminal making text data like a PC for an email communication internet access device, (5) and the end of operation and storage.

(1), (2); At the stage when the terminal is going to be used as a wireless voice telephone from "not in use" state (FIG. 4), by a way of such that he presses a button to select telephone (not shown in the figure), a power switch 7 turns on and the panels 1 and 2 are slid by user's hands from FIG. 5A (FIG. 4), position to FIG. 5B position.

The panels are slid each other until where the right end of the portion of the hinge unit 11A touches the left end of that 12A, resulting that the 10 numerical convertible keys 4B2 of the panel 1 and a part of the function convertible keys 4D2 to appear as shown in FIG. 5B.

He will hold the terminal by one hand (e.g. left hand) while the other hand (right hand) is pressing the numerical convertible keys 4B2 to enter address numbers (dial) and then pressing the send key, which is one of the function convertible keys 4D2.

(2); Then, he will hold the terminal by one hand (right hand), place the speaker 5 close to his ear, place the microphone 6 to his mouth and then communicate with the person he is calling.

After communication is finished, if he will press the end key, which is another function convertible key 4D2, the panel 1 will be slid back to its original position (either FIG. 4 or FIG. 5A).

(3); Then at the position shown in either FIG. 4 or FIG. 5A holding the terminal at both edges of its length by both hands, he will press the video camera button (not shown). He will direct the camera unit 10 to a photographic subject, confirm the position of the subject using 3A as a view finder, confirm that the subject is in focus, and press the shutter button 14. He will then confirm that the picture is taken by 10, open the panels 1, 2 to the position shown in FIG. 3 and see the high definition picture by the display 3.

After completing the video camera usage, he will close the panel 1, as shown in FIG. 4 and FIG. 5A, and turn off the power button 7.

(4); To use the terminal making text data as an internet access device like a PC for e.g., to send email, he will reopen by rotating the hinge unit of the panels 1, 2, after turning the power switch 7 on and pushing a button selecting making text mode (not shown in figure). Then he will input the recipient's address, email text, or select the graphic image that he took as aforementioned by using the alphabet keys 4A, numerical keys 4B1, numerical convertible keys 4B2, mark keys 4C, function keys 4D1 and function convertible keys 4D2, while he scrolls the scroll dial 16.

(5); Lastly, he will operate to send the email and after confirming that the transmission is complete, turn off the power switch 7, close the panels 1, 2 and return to the position shown in FIG. 4 or FIG. 5A.

In this embodiment, the microphone 6 is located close to the user's mouth and the speaker 5 is located close to his ear for ease of use, however, the location of 5 and 6 is not limited to their location in this embodiment.

To summarize the first embodiment described above, the present invention provides the portable terminal, comprising:

(1) The panel 1 at least comprises the display 3 consisting of liquid crystals, light emitting diodes or any other display device and the speaker 5 for audio output:

(2) The panel 2 at least comprises the keyboard 4, the microphone 6 for audio input:

(3) The panels 1, 2 are connected by the invented mechanism capable of both sliding and rotating function:

(4) The panels 1, 2 are electrically connected by the invented interconnection scheme having both sliding contacts and rotating contacts:

(5) The scheme saving net numbers of keys is realized by the introduction of the invented convertible key concept such as 4B2, 4D2.

The portable terminal enables the optimum man-machine-interface to be used as a wireless voice telephone, a terminal making text data of emails in internet access and a video camera.

The portable terminal enables to save a number of components such as 10 numerical keys resulting in that its size becomes compact and that its consuming power substantially becomes reduced.

In the next, a second embodiment of a portable terminal will be explained by using FIG. 8, which is a detail perspective view of the portable terminal of the present invention in case of the terminal making text data. The second embodiment of the terminal will be also described by using FIG. 8 in case of the terminal as both a wireless voice telephone and a video camera.

Figure 8:
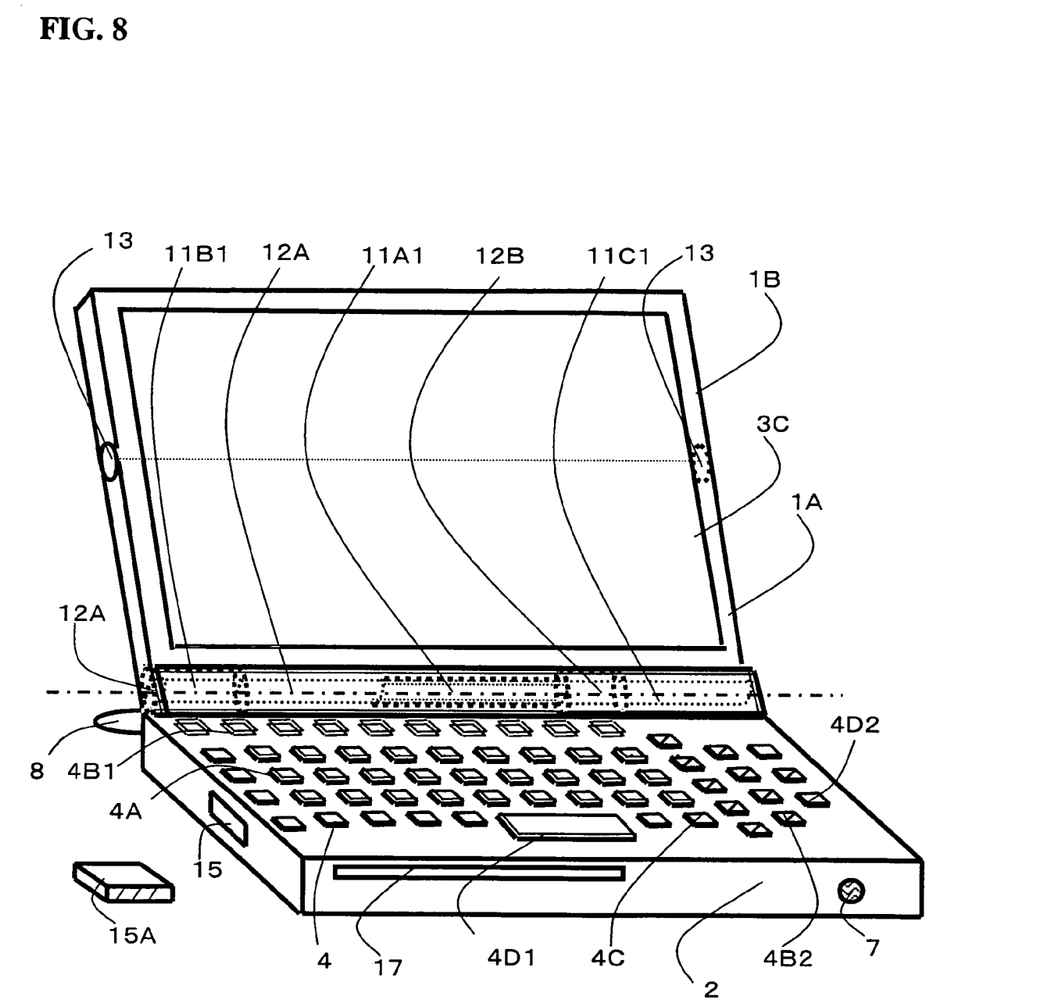
FIG. 8 is a detail perspective view of the portable terminal according to a second embodiment of the present invention in case of a terminal inputting text data.

In FIG. 8, a first panel portion 1A of the panel 1 and a second panel portion 1B of the panel 1 are linked by another hinge unit 13.

On a top surface of the panels 1A, 1B, a foldable display 3C is arranged. Other components and mechanisms are accorded with those having respective numbers in FIG. 3 to FIG. 7.

The panels 1A, 1B are corresponded to the panel 1 in FIG. 3.

In this embodiment, the foldable display 3C is used in order to make larger a size of the display device 3 in FIG. 3. In case of unused state or use as a video camera, the terminal is formed in fully overlapped state of the panel 2, 1A and 1B, wherein the panels 1A, 1B are formed in fully overlapped state, as well.

In case of use as the terminal making text data like a PC, the panels 1A, 1B are opened together from the panel 2, and then the panels 1B is further opened from the panel 1A until those two panels 1A, 1B become flat by being rotated around the hinge unit 13, when a stopper (not shown) detects that opened angle becomes 180 degree, resulting in a form of FIG. 8. Another stopper (not shown) adjusts specific angle between the panels 1A, 1B and the panel 2 such that stays 100 to 130 degree so as not for the terminal to be fallen due to that gravity of the panels 1A, 1B generates floating force for the panel 2 which weight itself has downside force to grounds, resulting in that the terminal becomes imbalance.

In case of that the terminal is used as a wireless voice telephone, the panels 1A, 1B kept in a fully overlapped state are slid from the panel 2, a form of which looks like FIG. 5B.

The size of the terminal is; for the panel 2, length 14 centimeter, width 5.6 centimeter, thickness 1.2 centimeter; for the panel 1A, length 14 centimeter, width 5.6 centimeter, thickness 0.6 centimeter; for the panel 1B, length 14 centimeter, width 4.8 centimeters, thickness 0.6 centimeter.

Although the invention has been illustrated and described with respect to exemplary embodiment thereof, it should be understood by those skilled in the art that the foregoing and various other changes, omissions and additions may be made therein and thereto, without departing from the spirit and scope of the present invention. For example, transmission signals between the panel 1 and 2 in FIG. 3 to FIG. 7B can be carried out by using either electrical or optical wireless scheme, as well.

Also, the use form of the portable terminal as a wireless voice telephone as shown in FIG. 5B, is not always restricted to cellular phone system, but IP wireless phone system based on both wireless LAN and internet system may be applied, as well.

Also, the use form of the terminal as a terminal making text as shown in FIG. 3 may be applicable to inputting some words, such as name address using keys in that figure. Therefore, the present invention should not be understood as limited to the specific embodiment set out above but to include all possible embodiments which can be embodies within a scope encompassed and equivalents there of with respect to the feature set out in the appended claims.

What is claimed is:

1. A portable terminal comprising:
   a first panel at least having a display connected by a hinge unit to a second panel at least having a keyboard, wherein a part of said hinge unit is attached on said first panel and another part of said hinge unit is attached on said second panel;
   wherein said hinge unit has both a rotating mechanism that rotates around a center axis of said hinge unit and a sliding mechanism that slides in the longitudinal direction along the center axis of said hinge unit;
   wherein at least 10 numerical keys of the keyboard of said second panel are exposed by sliding said first and said second panels with respect to each other, said at least 10 numerical keys being on a surface place of said second panel exposed from said first panel by said sliding; and
   wherein at least one of said at least 10 numerical keys acts as at least one of alphabet character keys, mark keys, and function keys by opening said first and said second panels by rotating said hinge unit.

2. A portable terminal formed by connecting both a first panel at least having a display and a second panel at least having a keyboard with a hinge unit, wherein a part of said hinge unit is attached on said first panel and another part of said hinge unit is attached on said second panel, comprising:
   said hinge unit has both a rotating mechanism around a center axis of said hinge unit and a sliding mechanism in the longitudinal direction along the center axis of said hinge unit;
   wherein a hook is attached at a counter side of said first panel where said hinge unit is placed and is slid in a sliding slot attached at a counter side of said second panel where said hinge is placed.

3. A portable terminal comprising:
   a first panel at least having a display connected by a hinge unit to a second panel at least having a keyboard, wherein a part of said hinge unit is attached on said first panel and another part of said hinge unit is attached on said second panel;
   wherein said hinge unit has both a rotating mechanism that rotates around a center axis of said hinge unit and a sliding mechanism that slides in the longitudinal direction along the center axis of said hinge unit; and
   wherein said first panel has electronic components at least used for said display and said second panel has electronic components at least used for said keyboard, both said first and second panels being electrically connected by an interconnection scheme comprising sliding electrocouplings and rotating electrocouplings at said hinge unit.

4. A portable terminal as set forth in claim 3, wherein said rotating of electrocouplings comprise both an outer surface of first cylindrical part of said hinge unit and an inner surface of a second cylindrical part of said hinge unit.

5. A portable terminal as set forth in claim 3, wherein said rotating electrocouplings are composed of both an outer surface of a first cylindrical part of said hinge unit and an inner surface of a second cylindrical part of said hinge unit.

6. A portable terminal comprising:
   a first panel at least having a display connected by a hinge unit to a second panel at least having a keyboard, wherein a part of said hinge unit is attached on said first panel and another part of said hinge unit is attached on said second panel;
   wherein said hinge unit has both a rotating mechanism that rotates around a center axis of said hinge unit and a sliding mechanism that slides in the longitudinal direction along the center axis of said hinge unit;
   wherein at least 10 numerical keys of the keyboard of said second panel are exposed by sliding said first and said second panels with respect to each other, said at least 10 numerical keys being on a surface place of said second panel exposed from said first panel by said sliding; and
   wherein said first panel has electronic components at least used for said display and said second panel has electronic components at least used for said keyboard, both said first and second panels being electrically connected by an interconnection scheme that comprises sliding electrocouplings and rotating electrocouplings at said hinge unit.

7. A portable terminal formed by connecting a first panel having a display to a second panel having a keyboard comprising 10 numerical keys, via a hinge unit having both rotating and sliding mechanisms, wherein by manipulation thereof, at least one of said 10 numerical keys acts as at least voice telephone keys upon sliding said first and said second panels in relatively opposite directions along a center axis of said hinge unit, and said at least one of said 10 numerical keys acts as at least one of alphabet character keys, mark keys, and function keys for inputting text data upon rotating said first and said second panels around said hinge unit for opening said portable terminal.

8. A portable terminal as set forth in claim 7, wherein a function of said at least one of 10 numerical keys is converted from said at least one of alphabet character keys, mark keys, and function keys by sensing a signal in accordance with a motion of sliding said first panel and said second panel with respect to each other.

* * * * *